United States Patent
Yanagida et al.

[11] Patent Number: 5,083,303
[45] Date of Patent: Jan. 21, 1992

[54] SECTOR MARK DETECTING APPARATUS IN OPTICAL DISC APPARATUS

[75] Inventors: Tsuneo Yanagida, Nino; Motoo Azuma, Nagano; Kenji Kikkawa, Hachioji, all of Japan

[73] Assignee: Olympus Optical Co., Ltd., Tokyo, Japan

[21] Appl. No.: 343,654

[22] Filed: Apr. 27, 1989

[30] Foreign Application Priority Data

Apr. 28, 1988 [JP] Japan .................. 63-105975
Oct. 7, 1988 [JP] Japan .................. 63-253258

[51] Int. Cl.$^5$ .................................................. G11B 7/00
[52] U.S. Cl. .......................................................... 369/48
[58] Field of Search ................ 360/38.1, 37.1; 358/336, 314, 319; 369/48, 44.26, 44.32

[56] References Cited

U.S. PATENT DOCUMENTS

| | | | |
|---|---|---|---|
| 4,409,627 | 10/1983 | Eto et al. | 360/38.1 |
| 4,420,775 | 12/1983 | Yamazaki et al. | 360/38.1 |
| 4,518,996 | 5/1985 | Reitmeier et al. | 358/314 |
| 4,663,752 | 5/1987 | Kakuse et al. | 358/336 |
| 4,669,075 | 5/1987 | Abe | 358/336 |
| 4,733,312 | 3/1988 | Morimoto | 360/38.1 |
| 4,769,704 | 9/1988 | Hirai et al. | 358/319 |

FOREIGN PATENT DOCUMENTS 58-169337 10/1983 Japan .
60-201573 10/1985 Japan .
61-5476 1/1986 Japan .

Primary Examiner—Donald McElheny, Jr.
Attorney, Agent, or Firm—Armstrong, Nikaido, Marmelstein, Kubovcik & Murray

[57] ABSTRACT

Based on an output signal of a sector mark reading circuit reading a sector mark signal representing a sector mark area, the interval in which the next sector mark signal is to be detected is anticipated, and a quasi-sector mark is generated at a time when the next sector mark is to be detected in each sector. Even if the sector mark reading fails, the sector mark will be able to be output at an accurate timing. Also, if the read sector mark signal, which is mis-detected or not, is determined, a highly reliable sector mark signal may be produced.

17 Claims, 13 Drawing Sheets

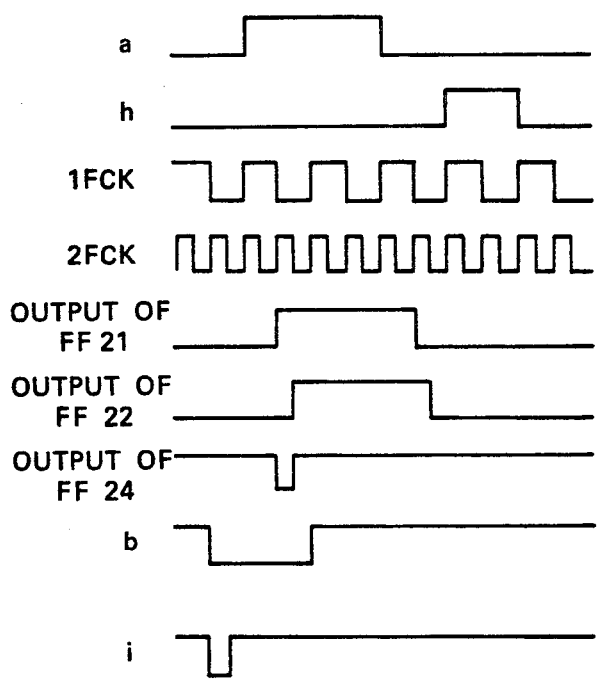
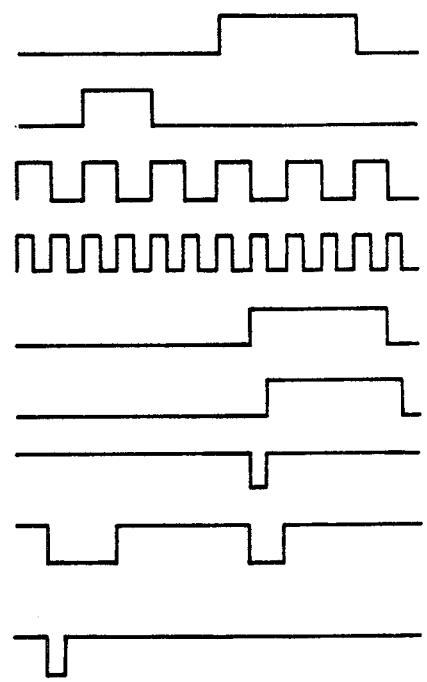

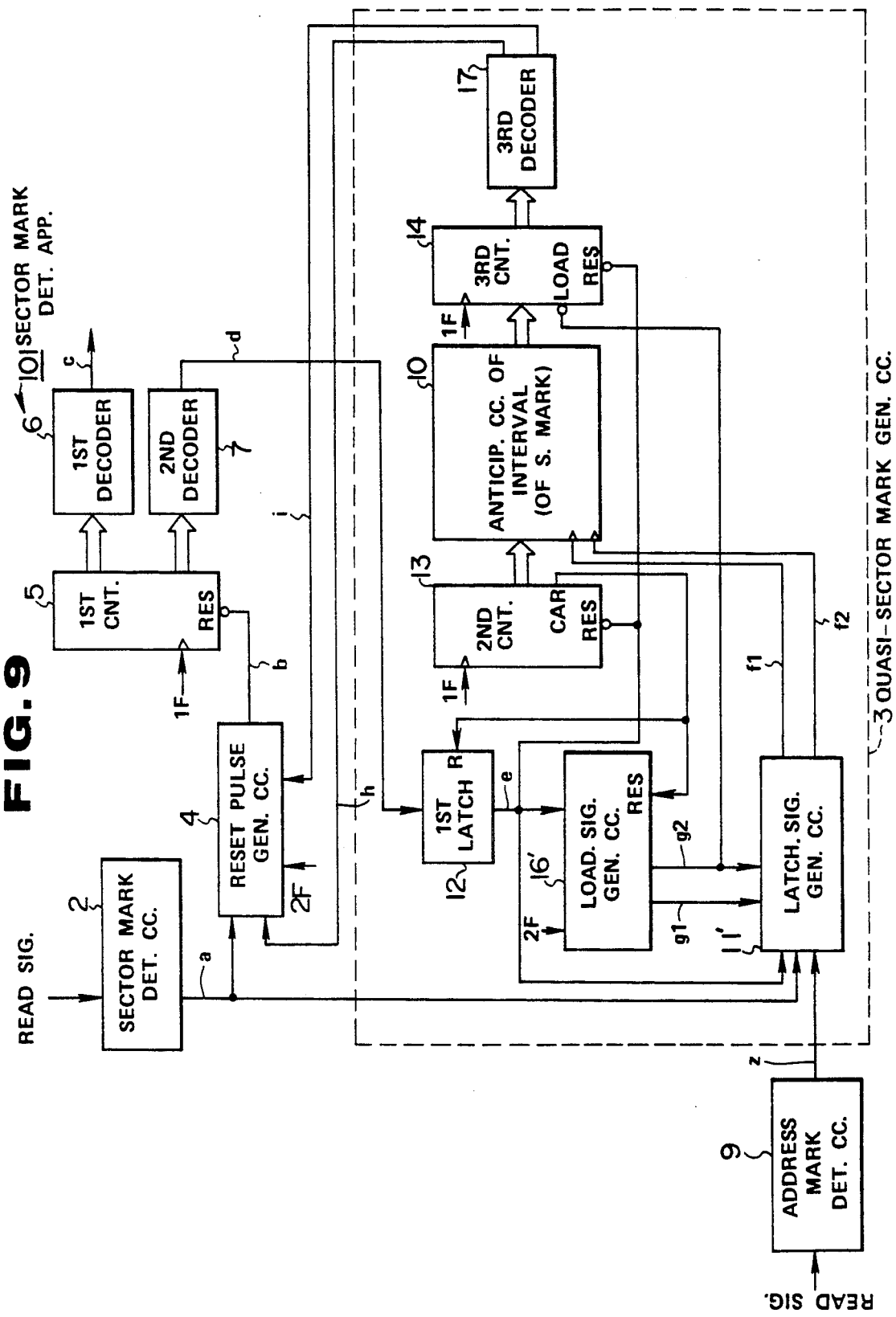

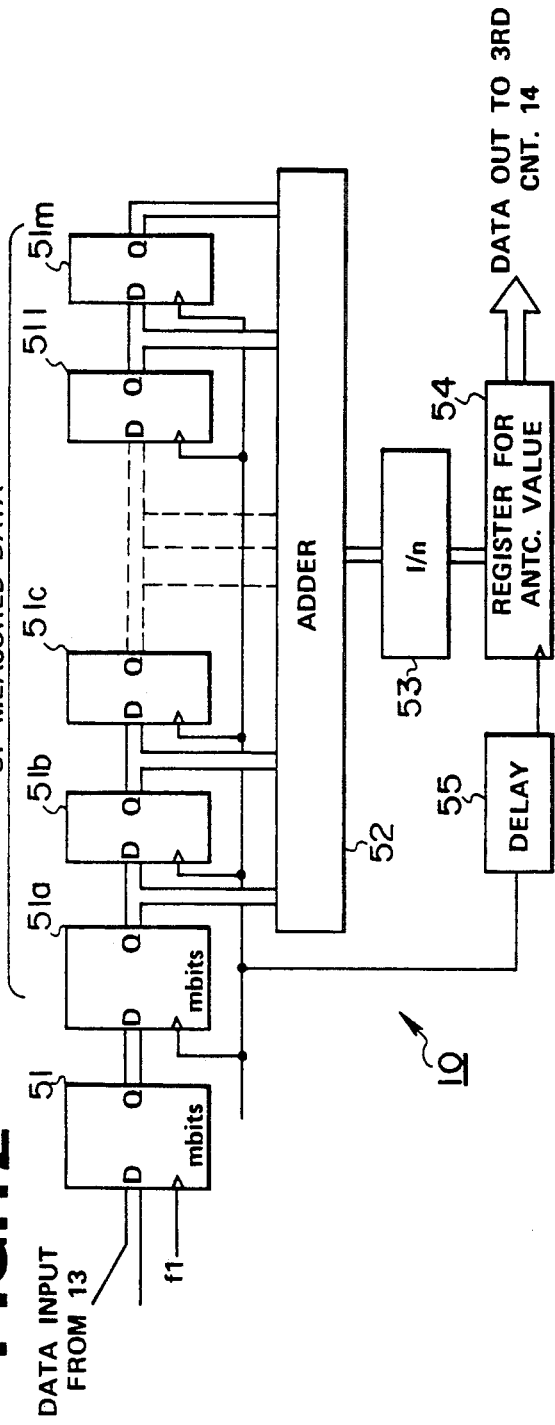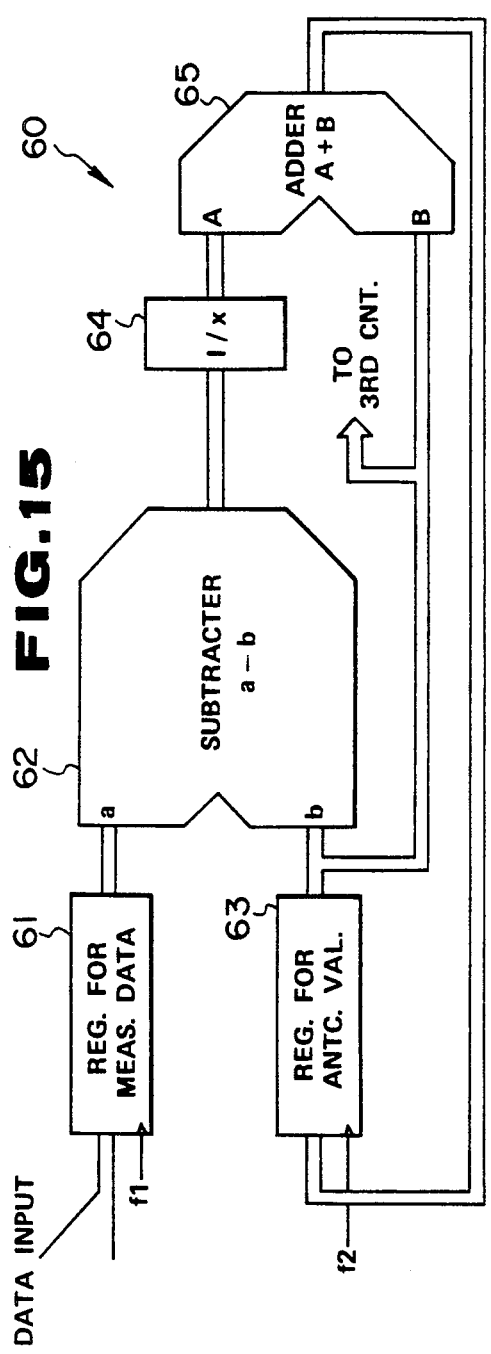

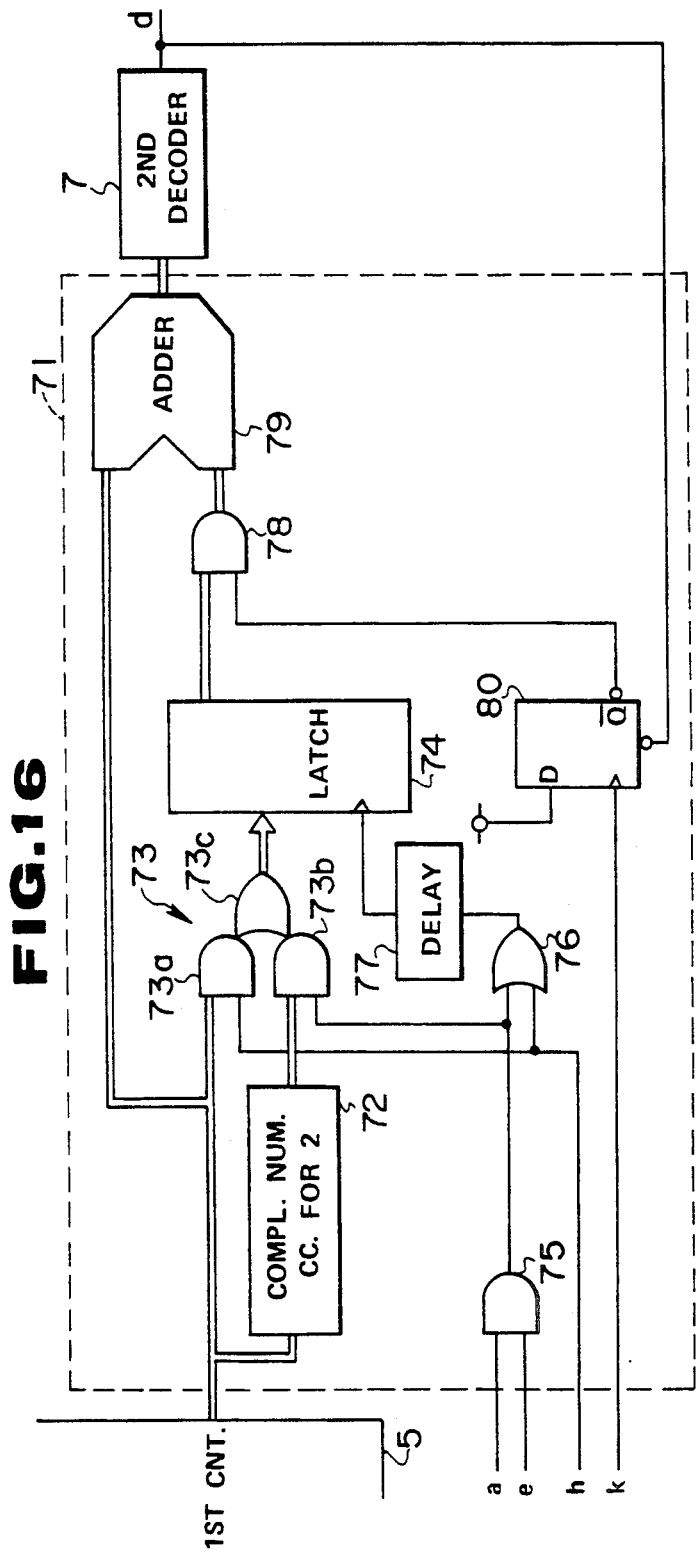
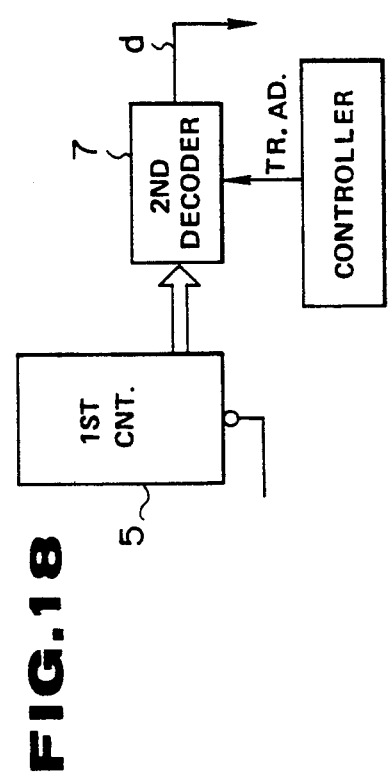
FIG.16
FIG.18

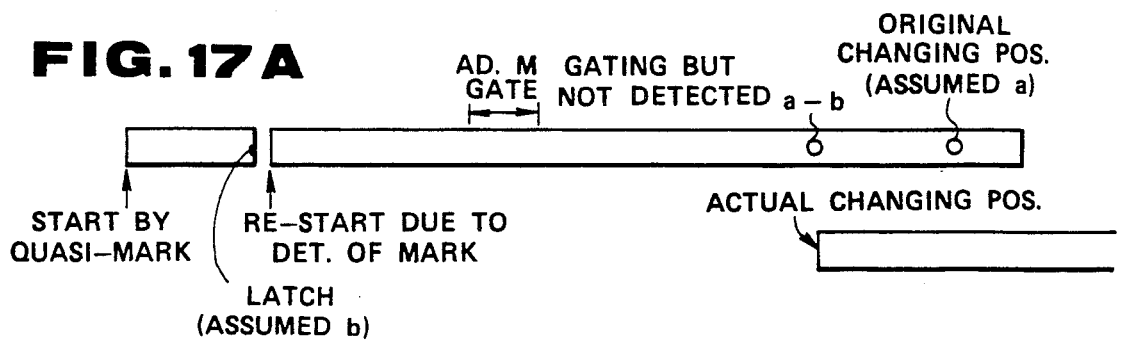
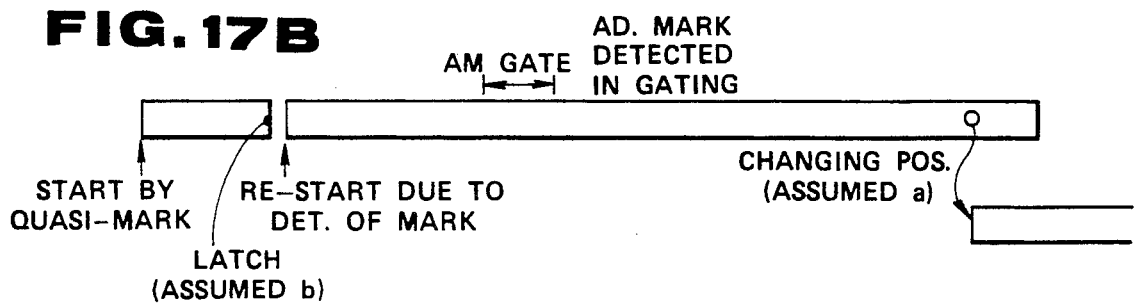
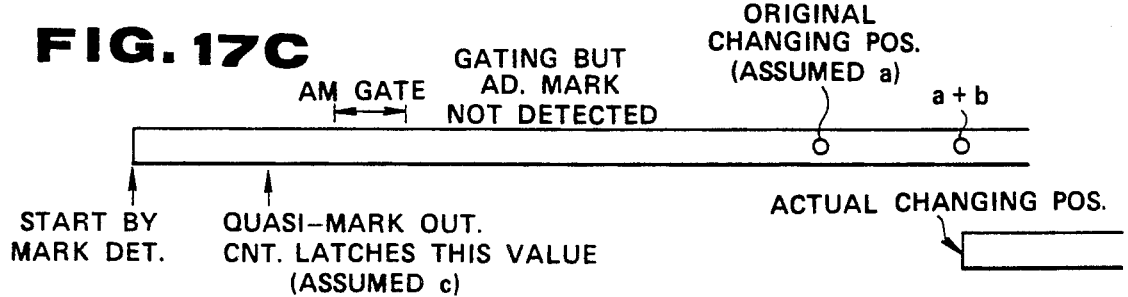
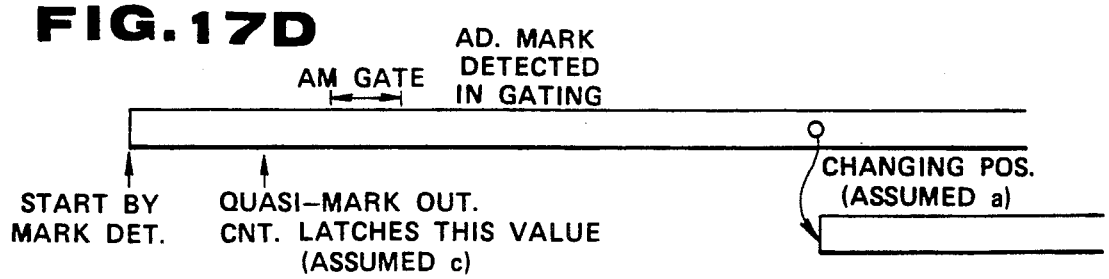

SECTOR MARK DETECTING APPARATUS IN OPTICAL DISC APPARATUS

BACKGROUND OF THE INVENTION

1. Field of the Invention and Related Art Statement

This invention relates to a sector mark detecting apparatus in an optical disc apparatus detecting a starting point of each of a plurality of sectors formed in each track in an optical disc.

A disc-like recording medium is extensively used in an optical recording and reading apparatus.

In a recording and reading apparatus (which shall be mentioned as an optical disc apparatus hereinafter) using the above mentioned disc-like reading medium (which shall be mentioned as an optical disc hereinafter), information data is recorded along a concentric circular or spiral track of an optical disc. In such a case, a sector formed by dividing each track into many sectors is used as a data processing unit.

That is, when recording or reading information in an optical disc, in controlling a random access or READ/WRITE, a mark showing the starting point is attached as one recording unit. This recording unit is called a sector and this mark is called a sector mark.

The above mentioned sector mark makes easy not only the above mentioned control but also the timing control at the time of reading and writing data and is useful to elevate the reliability of the detection of a synchronous signal.

As mentioned above, the sector mark is effective to control an access or to detect a signal at the time of reading or writing and therefore its detection reliability must be high enough. In an optical disc, it is difficult to make a recording film defect or noise small enough. It is necessary to make an apparatus which can allow an error as a bit error rate of $10^{-5}$ to $10^{-6}$. Among the above mentioned errors, a burst error rather than a random error is particularly a problem.

The reliability of recorded data will be improved by adding an error correcting mark. A burst error can be dispersed by an interleaving means of dispersing and recording data. Even a considerably long burst error can be taken care of.

However, this means can not be applied to the sector mark detection which can not be practiced without any reliability elevation.

In order to solve the above mentioned problem, a sector mark detecting means wherein a special pattern is made a sector mark pattern is disclosed in the publication of a Japanese Patent Application Laid Open No.169337/1983.

Also, the sector mark pattern is pre-formatted in the disc together with the ID part having information such as the track and sector address.

This sector mark is very high in detection probability as described in the above mentioned Japanese Patent Application Laid Open No.169337/1983 but, in fact, may not be often detected due to the stain of the disc, the flaw at the time of molding the disc and the tracking lag.

Therefore, in a prior art example in a Japanese Patent Application Laid Open No.5476/1986, a means such a gate is used to prevent the mis-detection of sector marks. However, the larger the rotation error, the larger the gate width must be. In considering that the mark may not be continuously detected, the gate width must be larger. Thus, the mis-detection (by the detection with $_5C_3$ or the like) near a sector mark can not be prevented.

In a prior art example disclosed in a Japanese Patent Application Laid Open No.201573/1985, there is adopted a method wherein a sector mark is indicated by a period timer by which a sector mark is to be detected inherently by utilizing that the sector mark should be detected in an equal period and, in case a sector mark is not detected even at the end of this period, a quasi-sector mark signal will be generated and will be used in place of the inherent sector mark.

In the system disclosed in the above mentioned Japanese Patent Application Laid Open No.201573/1985, after it is detected that a sector mark reading signal has not been generated, a quasi-sector mark signal will be generated and therefore the quasi-sector mark signal can not help being generated by all means as delayed from the timing when the sector mark reading signal should be inherently generated.

There has been a defect that, if the above mentioned timing lags, the reliability on the inherent sector mark reading will be reduced.

OBJECTS AND SUMMARY OF THE INVENTION

An object of the present invention is to provide a sector mark detecting apparatus wherein, even in case there is an error that a sector mark is not detected, a quasi-sector mark detecting signal will be able to be detected at an accurate timing.

Another object of the present invention is to provide a sector mark detecting apparatus wherein, even in case there is a sector mark detecting error, a correct sector mark detecting signal will be able to be output at an accurate timing.

A further object of the present invention is to realize an optical information recording and reproducing apparatus wherein information high in reliability can be recorded/read.

In the present invention, a sector mark signal can be output at an accurate timing by a sector mark reading device reading a sector mark representing a top part of each sector of an optical disc. A sector mark distance measuring device measures the distance to the next sector, mark. A quasi-sector mark generating device generates a quasi-sector mark signal at a timing when it is anticipated that a sector mark signal is detected in each sector on the basis of an output signal of the above mentioned measuring device. A composite sector mark signal producing device produces a sector mark signal in which an erroneous reading is compensated from the above mentioned sector mark signal and quasi-sector mark signal.

Also, a means of determining if a factor mark signal is mis-detected or not is provided so that a sector mark signal having less errors may be produced.

BRIEF DESCRIPTION OF THE DRAWINGS:

FIGS. 1 to 8 relate to the first embodiment of the present invention.

FIG. 1 is a block diagram showing the formation of a sector mark detecting apparatus of the first embodiment.

FIG. 2 is a general formation view of an optical disc apparatus provided with the first embodiment.

FIG. 3 is a circuit diagram showing the formation of a resetting pulse generating circuit.

FIG. 4 is a circuit diagram showing the formation of a latching signal generating circuit.

FIG. 5 a circuit diagram showing the formation of a loading signal generating circuit.

FIG. 6 is a timing chart for explaining the operation.

FIG. 7 is an explanatory view showing counting operation ranges of first, second and third counters.

FIGS. 8A-8B are timing charts showing timings when resetting pulses are generated in case a quasi-sector mark signal is generated at a timing different from that of a sector mark signal.

FIGS. 9 to 14 relate to the second embodiment.

FIG. 9 is a block diagram showing the formation of a sector mark detecting apparatus of the second embodiment.

FIG. 10 is a circuit diagram showing the formation of a latching signal generating circuit.

FIG. 11 is a circuit diagram showing the formation of a loading signal generating circuit.

FIG. 12 is a circuit diagram showing the formation of a sector mark interval anticipating circuit.

FIGS. 13 and 14 are operation explaining timing chart views.

FIG. 15 is a circuit diagram of a sector mark interval anticipating circuit in the third embodiment of the present invention.

FIG. 16 is a circuit diagram showing the formation of a quasi-sector mark adopting circuit in the fourth embodiment of the present invention.

FIGS. 17A-17D are operation explaining views of the fourth embodiment.

FIG. 18 is a block diagram showing essential parts of the fifth embodiment of the present invention.

DETAILED DESCRIPTION OF PREFERRED EMBODIMENTS

Figure 2:
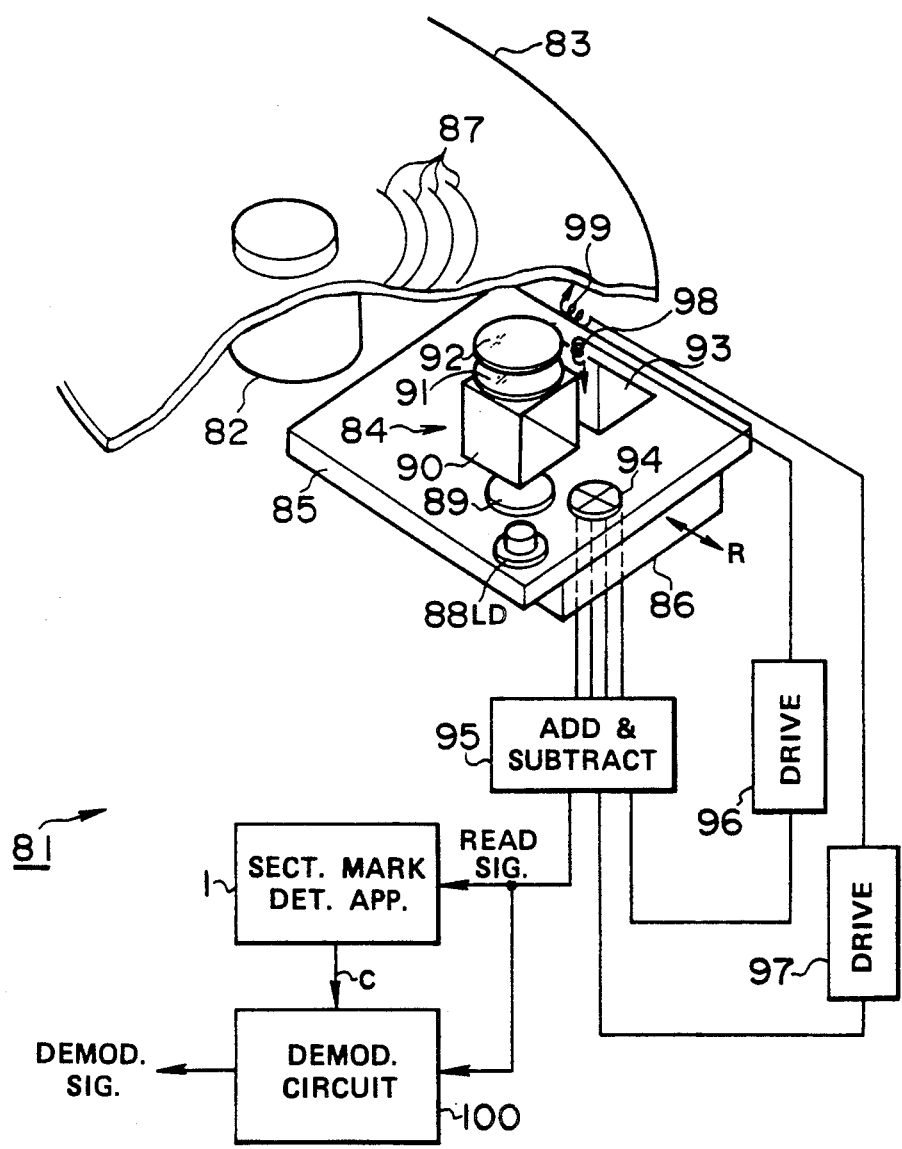

In an optical disc apparatus 81 provided with the first embodiment, as shown in FIG. 2, an optical pickup 84 is arranged as opposed to an optical disc 83 as an optical recording medium rotated and driven by a spindle motor 82. This pickup 84 is mounted on a carriage 85 so as to be movable by such rough moving means as a VCM (voice coil motor) 86 in the direction crossing concentric circular or spiral tracks 87, that is, in the radial direction R of the optical disc 83.

In the pickup 84 mounted on the carriage 85, a laser diode 88 is contained within a housing (not illustrated) and the front surface light of this laser diode 88 is a diffusing light beam, is made a parallel light beam by a collimating lens 89, is then incident upon a polarized beam splitter 90, for example, by a P polarization and is transmitted substantially by 100%. The light transmitted through this polarized beam splitter 90 is made a light beam of a circular polarization by a ¼ wavelength plate 91, is then condensed by an objective lens 92 and is radiated to an optical disc 83.

The reflected light in the above mentioned optical disc 83 is passed through the objective lens 92, is then S-polarized by the ¼ wavelength plate 91, is incident upon the polarized beam splitter 90, is reflected substantially by 100% and is incident upon a critical angle prism 93. The light beam reflected by the slope of this critical angle prism 93 is received by a light detector 94 opposed to the exit end surface of this prism and arranged in the position of a far field.

The above mentioned light detector 94 is formed, for example, of a four-divided light receiving device, its output is input into an adding and subtracting circuit 95 and a reading signal is produced by the total sum (addition) of the four light receiving devices. A focus error signal $F_{ER}$ is produced by a pair of differential outputs divided by a line parallel with the radial direction R and a tracking error signal $T_{ER}$ is produced. Both of these signals $F_{ER}$ and $T_{ER}$ are applied respectively to a focusing coil 98 and tracking coil 99 forming an actuator respectively through driving circuits 96 and 97 and a servo system holding the objective lens 92 in a focusing state and tracking state is formed.

In the above mentioned laser diode 88, a photodiode (not illustrated) is enclosed within its package and receives the back surface light of this laser diode 88. With its photoelectric converting output, an APC is made to control the light emitting output of the laser diode 88 in a reproducing mode.

The above mentioned reading signal is input into a (data) demodulating circuit 100 to demodulate information recorded in the data range and is input also into the sector mark detecting apparatus 1 of the first embodiment to produce a composite sector mark signal c which is also input into the demodulating circuit 100 to be used to demodulate and control the data.

Figure 1:
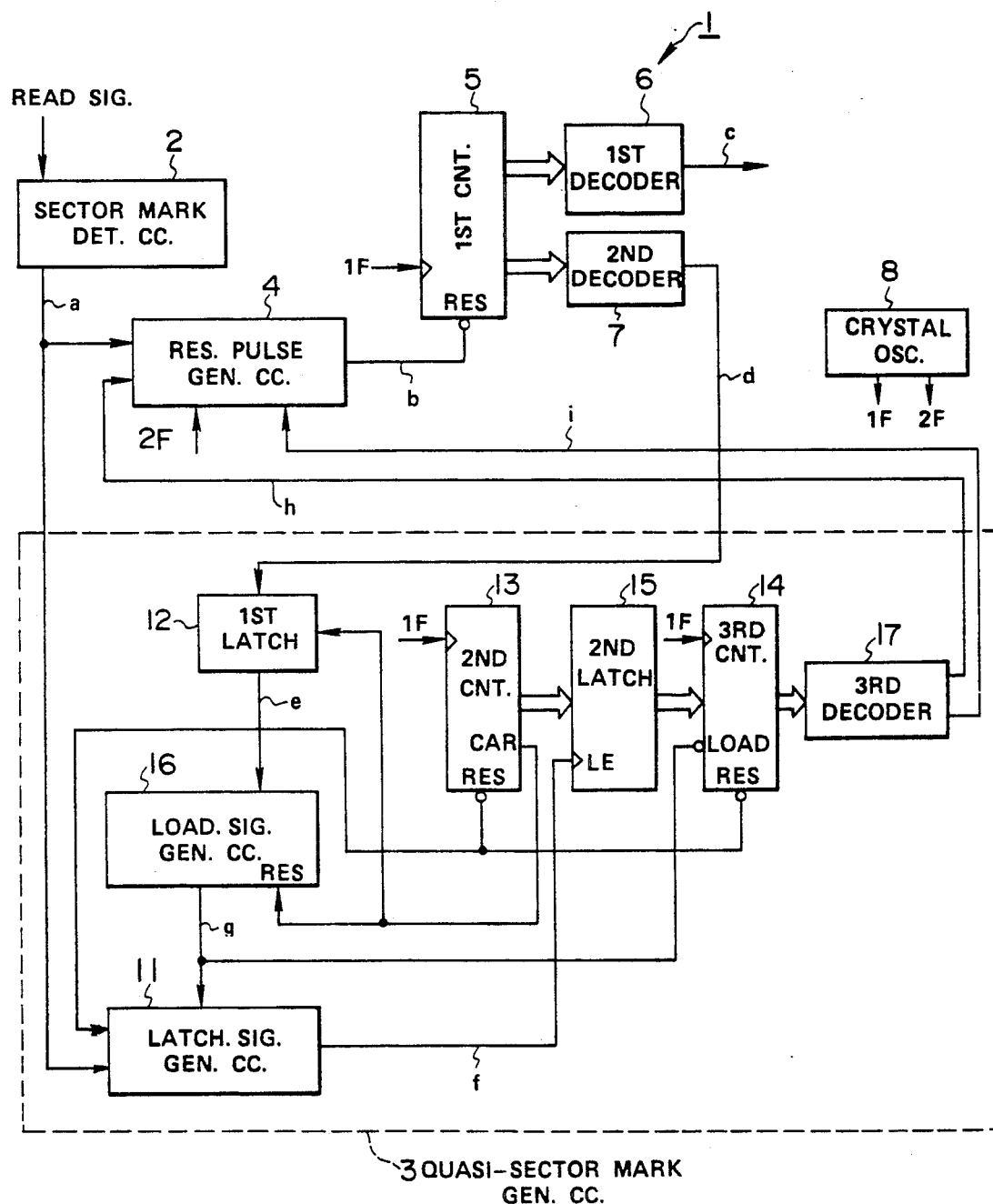

As shown in FIG. 1, the sector mark detecting apparatus 1 of the first embodiment comprises a sector mark detecting circuit 2 generating a sector mark detecting signal a by a reading signal from a photodisc, a quasi-sector mark signal generating circuit 3 in which this sector mark detecting signal a is input and a quasi-sector mark signal is generated, a resetting pulse generating circuit 4 in which the sector mark detecting signal a and quasi-sector mark signal h are input and a resetting pulse b is output to prefer the sector mark detecting signal a, a first counter 5 in which this resetting pulse b is applied to the resetting terminal and then a counting operation is made and a first decoder 6 and second decoder 7 connected to the output end of this counter 5 so that, in case a set value is reached, a composite sector mark signal c and timing sign d may be respectively output.

The sector mark detecting signal a output from the above mentioned sector mark detecting circuit 2 is input into the resetting pulse generating circuit 4 and a latching signal generating circuit 11 forming the quasi-sector mark signal generating circuit 3. As shown in FIG. 6b, when the sector mark detecting signal a is generated or by the generation of a quasi-sector mark h in case this sector mark detecting signal is not generated, this resetting pulse generating circuit 4 will start the first counter 5 which have been reset.

After this resetting pulse b is applied, the first counter counts a 1F clock applied to a clock input end from a crystal oscillator 8. In case a comparatively small counted value (decoder setting value) is reached, the first decoder 6 connected to the output end of this counter 5 will output a composite sector mark signal c. This manner is shown in FIG. 6c. Thereby, though the timing of reporting the sector mark detection outside is a little delayed, the composite sector mark signal c will be able to be fed always with a constant delay (even when the sector mark is not detected).

On the other hand, a comparatively large decoder setting value is set in the second decoder 7 connected to the output end of the above mentioned counter 5. That is, in FIG. 6, in each sector consisting of a sector mark area SM, identifying area ID, gap area GAP, data area DATA and buffer area BUF, the counter 5 is cleared by the resetting pulse b and then begins to count the 1F clock and the counted value of this counter 5 is set to reach this decoder setting value near the end of the data area or near reaching the buffer area.

Therefore, when this decoder setting value is reached, the second decoder 7 will output a timing signal shown in FIG. 6d and will input it into a first latch 12 forming the quasi-sector mark generating circuit 3 which will start the operation with this timing signal d.

The above mentioned first latch 12 outputs a latching output e of "H" as shown in FIG. 6e with the above mentioned timing signal d, this latching output e is applied to the resetting ends of the second counter 13 and third counter 14 and starts the counting operation which has been made "L" and has been reset.

Figure 7:
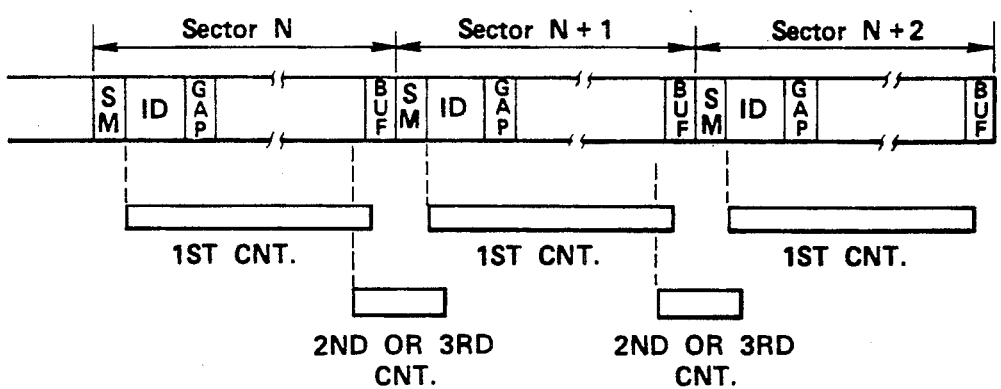

As shown in FIG. 7, the above mentioned second and third counters 13 and 14 are to make the counting operation from near the end of the data area to near the tip of the ID part with the next sector mark area between. Both of these counters 13 and 14 count the 1F clock. As shown in FIG. 7, the first counter, 5 is to count the predetermined time (the decoder setting value of the second decoder 7) from the end of the sector mark area until the above mentioned second and third counters 13 and 14 are started and to cover the starting time of the second and third counters 13 and 14.

The counted value of the second counter 13 started from near the end of the above mentioned data area is input into a second latch 15 connected to its output end. With a latching signal f output from the above mentioned latching signal generating circuit 11, this second latch 15 latches the counted value of the above mentioned second counter 13. As shown in FIG. 6f, this latching signal f is output at the timing when the sector mark detecting signal a is detected. This latching signal f is to be output not only when the sector mark detecting signal a is detected but also on the condition that the sector mark detecting signal a is detected in the sector before it. The sector mark detecting signal a, the latching output e of the first latch 12 and the loading signal g of the loading signal generating circuit 16 are input into the latching signal generating circuit 11 outputting this latching signal f.

Into this load signal generating circuit 16 are input the latch output e of the first latch 12 and the carrying output of the second counter 13 as a resetting signal. This loading signal generating circuit 16 outputs to the third counter 14 a loading signal g loading the sector mark interval latched in the second latch 15. As shown in FIG. 6g, this loading signal g is generated near the end of the data area in each sector. 2F clocks are input into the loading signal generating circuit 16.

The carrying output of the above mentioned second counter 13 resets the first latch 12 and loading signal generating circuit 16.

The above mentioned third counter 14 is a down counter wherein the counted value of the second latch 15 is taken in by the application of the loading signal g and is then counted down and a quasi-sector mark signal h shown in FIG. 6h is output at the same timing as the sector mark detecting signal a from the third decoder 17 connected to the output end of this third counter 14. This third decoder 17 outputs an output i (See FIGS. 8A-8B) even at the timing of the buffer area and resets the resetting pulse generating circuit 4.

Figure 3:
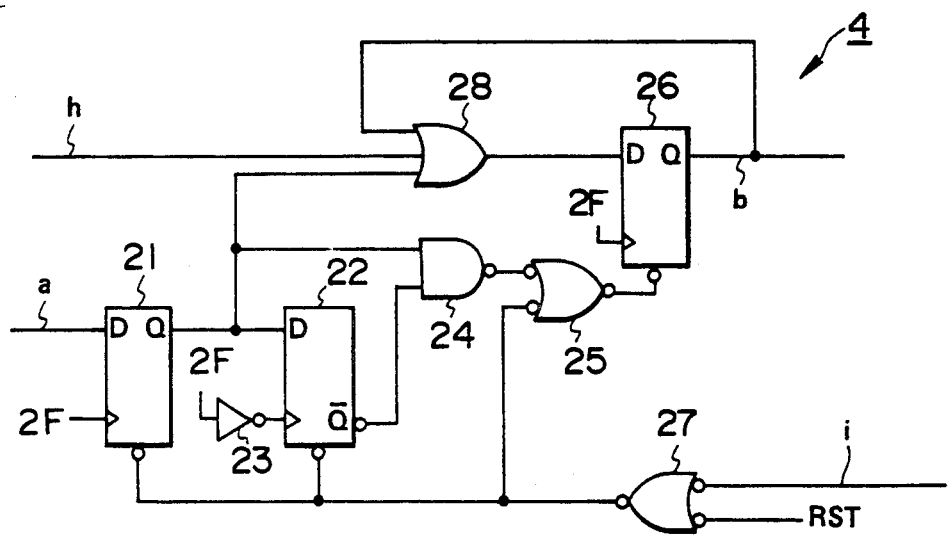

The formation of the resetting pulse generating circuit 4 shall be explained in the following with reference to FIG. 3.

The sector mark detecting signal a is applied to the data input end D of a first flip-flop (which shall be mentioned as D-FF hereinafter), is taken in at the rising of the 2F clocks and is output from the output end Q. This Q output is applied to the data input end D of the second D-FF 22 and is input together with the Q output of the above mentioned first D-FF 21 into a NAND circuit 24 from the output end $\overline{Q}$ by the 2F clocks inverted by an inverter 23.

The output of the above mentioned NAND circuit 24 becomes a timing pulse corresponding to the rising of the sector mark detecting signal a and is applied to the resetting terminal of the third D-FF 26 through an OR circuit 25.

The output i of the third decoder 17 and the resetting signal RST generated when the current source of the entire apparatus is on are applied to the above mentioned resetting terminal through an OR circuit 27 and the above mentioned OR circuit 25. As the output i of the above mentioned third decoder 17 is produced in a buffer area immediately before the sector mark area, the Q output b of the D-FF 26 will first become "L" as shown in FIGS. 8A-8B in the buffer area and will become "H" in the rising of the 2F clocks after the output of the NAND circuit 24 becoming a resetting signal to the third D-FF 26 returns to "H".

The output of the above mentioned OR circuit 27 is applied to the resetting terminals of the first and second D-FF 21 and 22 and resets the Q and $\overline{Q}$ outputs.

In this embodiment, irrespective of whether the sector mark detecting signal a is generated or not, the quasi-sector mark signal h will be generated in each sector. This quasi-sector mark signal h is controlled to be generated in the same position as the sector mark detecting signal a. Therefore, in case the sector mark detecting signal a and quasi-sector mark signal h are generated at the same timing, the D-FF 26 may be set by either of the quasi-sector mark signal h and sector mark detecting signal a and the first counter 5 may be started. However, in order to prefer the sector mark detecting signal a so that, even in case the timings of both signals a and h lag from each other, a correct operation may be made, the resetting signal b is made to be formed. Therefore, the quasi-sector mark signal h of the third decoder 17, the Q output of the second D-FF 21 and the Q output of the third D-FF 26 are applied to the data input end of this third D-FF 26 through the OR circuit 28.

As shown, for example, in FIG. 8A, in case the quasi-sector mark signal h is delayed to be later than the sector mark detecting signal a, once the Q output b of the D-FF 26 becomes "H" by the preceding sector mark detecting signal a, this "H" signal will be again input into the data input end D of the D-FF 26 through the OR circuit 28, the "H" level of the Q output b will be maintained and, even if the quasi-sector mark signal h then becomes "H", the Q output b will not vary at all and the sector mark detecting signal a will be preferred to start the first counter 5.

Also, as shown in FIG. 8B, in case the quasi-sector mark signal h precedes, the Q output of the D-FF 26 will be once shifted to "H" by the quasi-sector mark signal and the counting operation of the first counter 5 will start but, with the input of the sector mark detecting signal a, the Q output b will be again shifted to "L", the counted value of the first counter 5 will be reset and then the first counter 5 will be able to be restarted.

Thus, the resetting pulse generating circuit 4 prefers the sector mark detecting signal a to generate the resetting pulse b to the first counter 5.

In case the sector mark detecting signal a is not detected (for example, in the sector N+3)- only the quasi-sector mark signal h will be generated, the D-FF 26 will be set by the timing of this signal h and the counting operation of the first counter 5 will be started. Even in this case, as the timing of the generation of the quasi-sector mark signal h is determined by counting the timing when the sector mark detecting signal a is inherently generated, the composite sector mark signal c will be produced at an accurate time.

The formation of the latching signal generating circuit 11 shown in FIG. 4 shall be explained in the following.

The sector mark detecting signal a and the output e of the first latch 12 are input as clocks into the D-FF 32 through the AND circuit 31 and the "H" applied to the data input end D is output from the output end Q. The loading signal g is applied to the resetting terminal of this D-FF 32. Therefore, when a clock is applied to the clock input end of the above mentioned D-FF 32, the Q output will become "H". On the other hand, in case the sector mark detecting signal a is not output as in the sector N+3 in FIG. 6, as no clock is applied to this clock input end, the Q output j of the D-FF 32 will remain on the "L" level. In the other sectors, "H" level signals will be generated. This Q output j is applied to the data input end D of the D-FF 33 in the next step making the latch output e a clock. The Q output k of this D-FF 33 will output an "H" level in the sector just before in case the sector mark detecting signal a is detected. The latching signal f having passed the Q output of this D-FF 33 and the output of the above mentioned AND circuit 31 through the AND circuit 34 will output a signal of the "H" level only in case two continued sector mark detecting signals a are detected. The condition that this signal of the "H" level, that is, the latching signal f output from the AND circuit 34 will be output only in case two sector mark detecting signals a are detected as continued is imposed on the basis of the consideration that the value in the case that the sector mark detecting signal a is not detected and the time is controlled by using the quasi-sector mark signal h is not positive. Thus, the mis-detection of the sector mark can be compensated and the composite sector mark signal c higher in the reliability can be produced.

Figure 5:
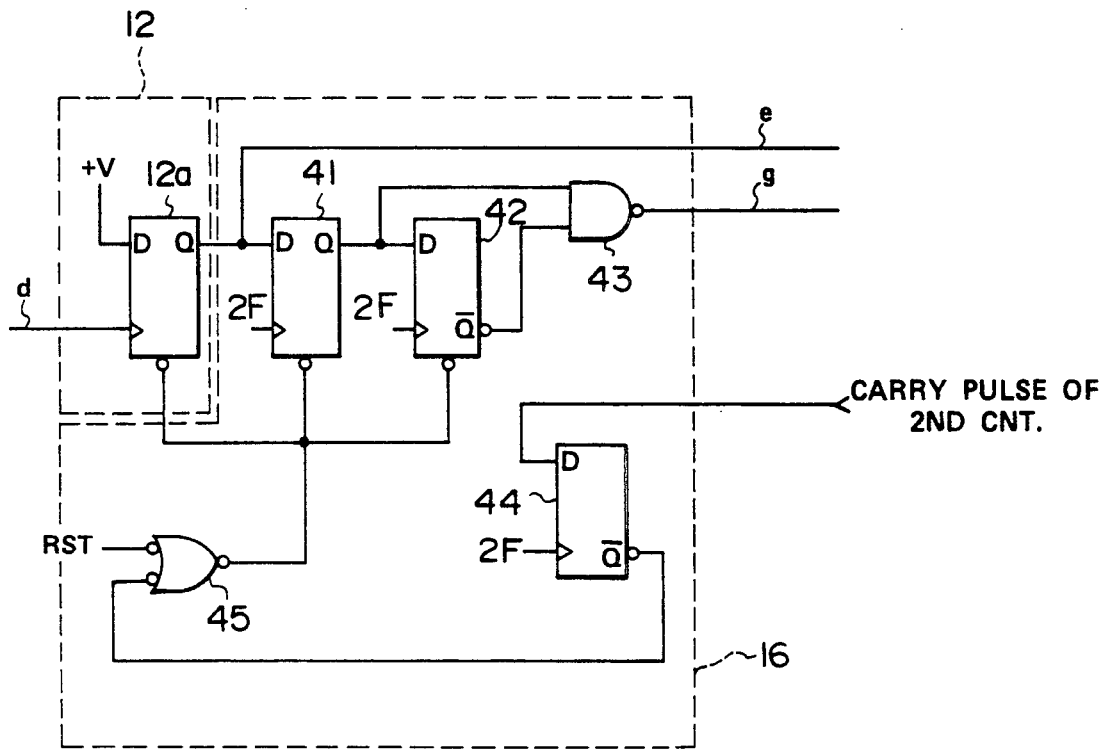

FIG. 5 shows the formations of the first latch 12 and loading signal generating circuit 16.

The first latch 12 is formed of a D-FF 12a, the voltage of the "H" level applied to the data input end D is latched with the output of the second decoder 7 applied to the clock input end and the latching output e is applied to the data input end D of the D-FF 41. The Q output of this D-FF 41 is applied to the data input end D of the D-FF 42 of the next step and is passed through the NAND circuit 43 together with the $\bar{Q}$ output of the D-FF 42 to produce the loading signal g.

Also, the carrying pulse of the second counter 13 is applied to the input end D of the D-FF 44 and is output to the OR circuit 45 from the output end $\bar{Q}$ by the 2F clocks. A resetting signal RST generated when the current source is on is also input into this OR circuit 45 and the output of this OR circuit 45 is applied to the resetting terminals of the DO-FF 12a, 41 and 42.

Figure 4:
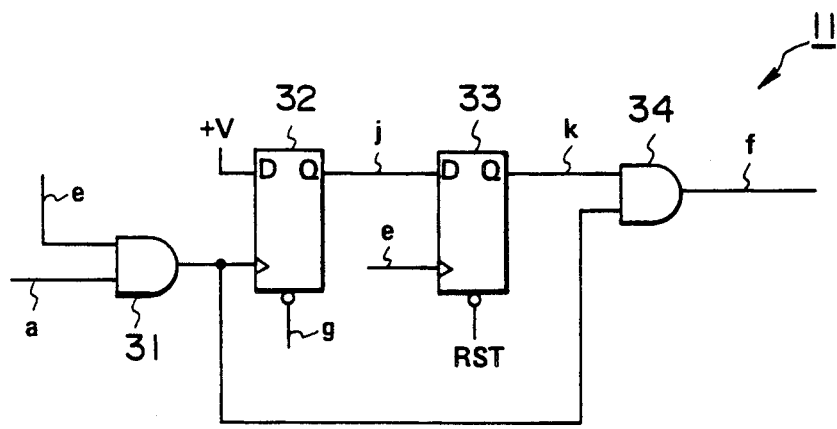

The formations of the above mentioned D-FF 41 and 42 and NAND circuit 43 are substantially the same as the formation of the latching signal generating circuit 11 shown in FIG. 4.

Therefore, the latch output e of the first latch 12 is made an input and the loading signal g generated in each sector near the end of the data area is output.

When the above mentioned loading signal g is applied to the load terminal of the third counter, the data depending on the sector mark interval latched by the second latch 15 will be loaded, counting will be started from near the end of the data area and the quasi-sector mark signal h will be output to the resetting pulse generating circuit 4 in the position of the next sector mark detecting signal a.

Figure 6:
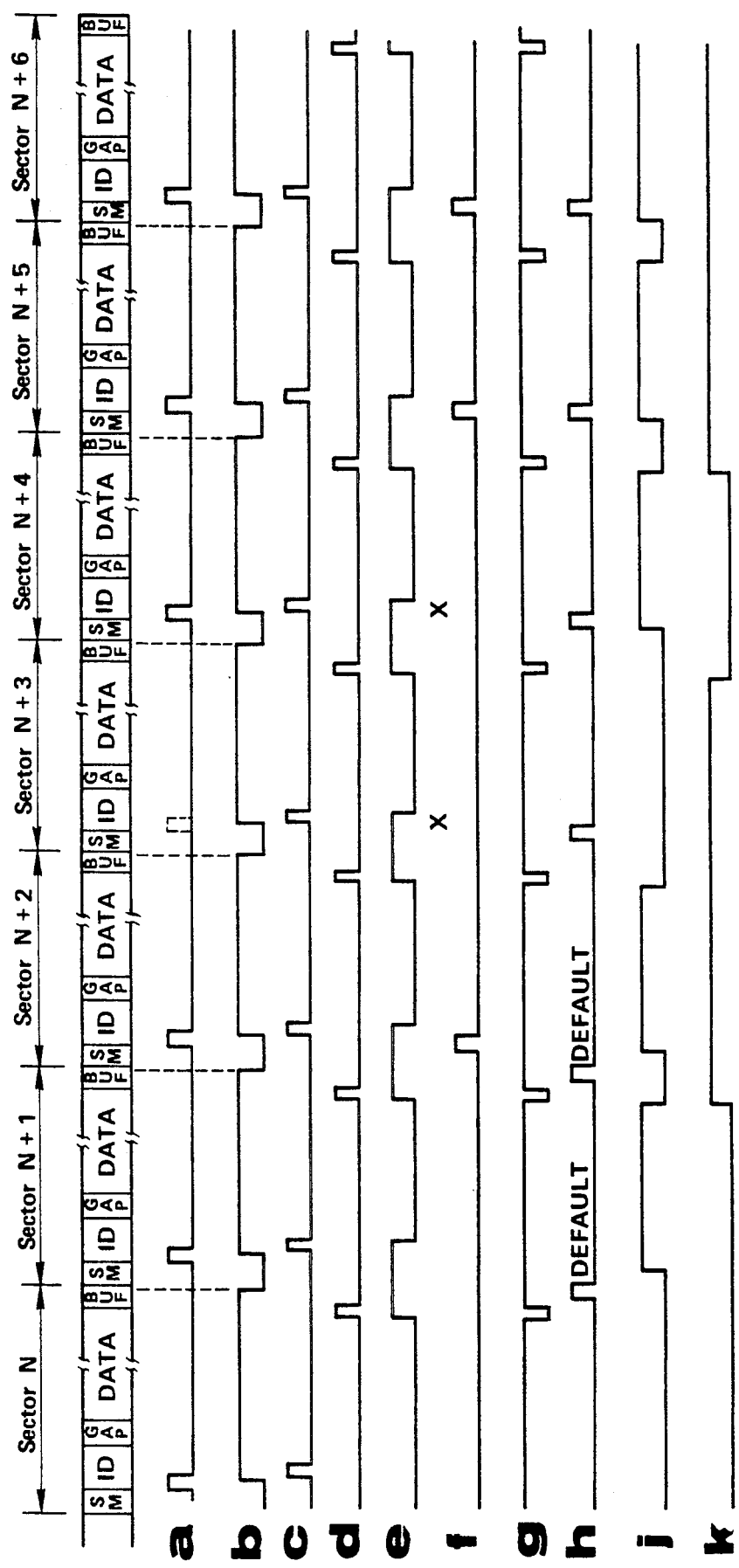

In this first embodiment, by the sector mark detecting circuit 2, the sector mark pattern recorded in the sector mark area is detected and the sector mark detecting signal a is output and, by the quasi-sector mark generating circuit 3, the quasi-sector mark signal h is generated at the timing when the above mentioned sector mark detecting signal a is anticipated to be detected and, on the basis of these sector mark detecting signal a and quasi-sector mark signal h, the composite signal c preferring the sector mark detecting signal a is produced. Therefore, by using this composite sector mark signal c, the random access or the like high in reliability and the WRITE/READ can be controlled. In FIG. 6, when the current source is on, the default value will be stored in the second latch 15 and the first two quasi-sector mark signals h will be output in this value.

In the above mentioned embodiment, the composite sector mark signal c of the sector mark detecting signal a and quasi-sector mark signal h is produced by preferring the sector mark detecting signal a but, depending on the use, an embodiment in which the composite signal is not generated in the case of the quasi-sector mark may be applied.

As described above, according to the first embodiment, as the means of generating the quasi-sector mark signal at the same timing as of the sector mark signal is formed, even in case the sector mark signal is not detected, the quasi-sector mark signal of an accurate timing will be able to be obtained.

FIG. 9 shows a sector mark detecting apparatus 101 of the second embodiment of the present invention.

This second embodiment is an improvement of the above mentioned first embodiment and is provided with a means of judging the sector mark detecting signal a output in case the sector mark is detected.

By this judging means, it can be prevented that, when the sector mark detecting signal a is detected by mistake, the interpolating means will mis-operate to make an erroneous interpolation.

The second embodiment shown in FIG. 9 is provided with an address mark detecting circuit 9 detecting an address from a reading signal in the first embodiment shown in FIG. 1. An address mark detecting signal z output from this address mark detecting circuit 9 is input into a latching signal generating circuit 11'.

This latching signal generating circuit 11' outputs a latching signal f2 and measuring signal f1 to a sector mark interval (period) anticipating circuit 10.

In this sector mark interval anticipating circuit 10, the counted value of the second counter 13 is further input and is counted and latched by the measuring signal f1 and latching signal f2 output from the above mentioned latching signal generating circuit 11'. This latching signal f2 is output at the timing when the sector mark detecting signal a is detected as shown in f2 in FIG. 13.

This measuring signal f1 will be output not only when the sector mark detecting signal a is detected but also on the condition that the sector mark detecting signal a and address mark detecting signal z are detected even in the sector just before. The latching signal f2 will be output only in the case that, just after the measuring signal f1 is output, further the address mark detecting signal z is output and thereby two continued sector marks are adopted. The sector mark detecting signal a, the latching output e of the first latch 12, the pre-selector mark adoption adequacy judging clock g1 and loading signal g2 of the loading signal generating circuit 16' and further the address mark detecting signal z are input into the latching signal generating circuit 11' outputting these measuring signal f1 and latching signal f2.

Into this loading signal generating circuit 16', the latching output e of the first latch 12 is input and also the carrying output of the second counter 13 is input as a resetting signal. This loading signal generating circuit 16' outputs to the third counter 14 the loading signal g2 loading the sector mark interval latched by the sector mark interval anticipating circuit 9. As shown in g2 in FIG. 13, this loading signal g2 is generated in each sector near the end of the data area.

The carrying output of the above mentioned second counter 13 resets the first latch 12 and load signal generating circuit 16'.

Figure 13:
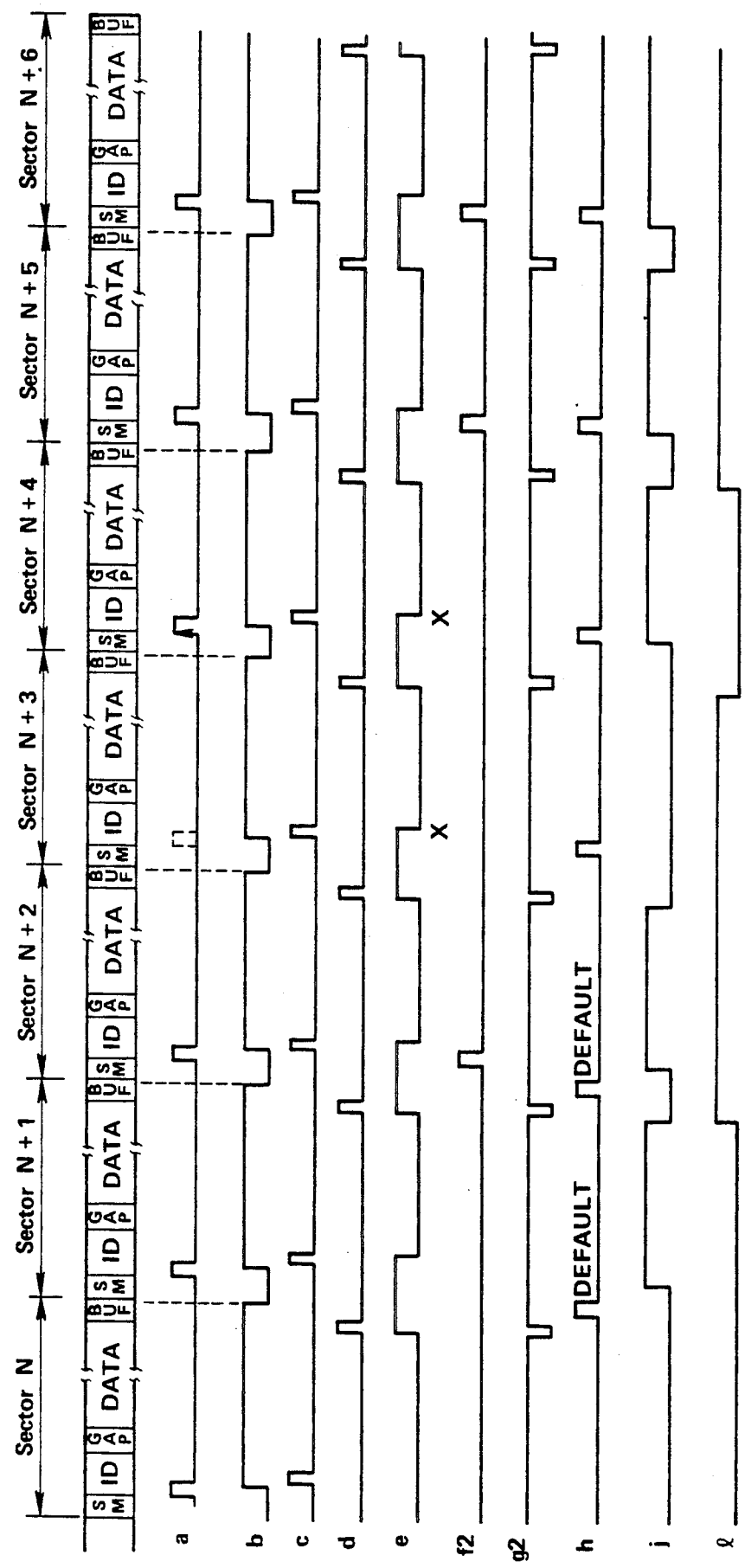

Now, the above mentioned third counter 14 is a down counter in which, by the application of the loading signal g2, the counted value of the sector mark interval anticipating circuit 10 is taken in as a preset value and is then counted down, the same timing as of the sector mark detecting signal a is anticipated from the third decoder 17 connected to the output end of this third counter 14 and the quasi-sector mark signal h shown in h in FIG. 13 is output.

The formation of the latching signal generating circuit 11' shown in FIG. 10 shall be explained in the following with reference to the timing chart in FIG. 14.

When the output e of the first latch 12 is on the "H" level (when the second and third counters 13 and 14 are released from resetting and are running), if the sector mark detecting circuit 2 detects the pulse signal of "H" which is the sector mark detecting signal a, this signal will be applied to the clock input end of the D-FF 32 through the AND circuit 31 together with the above mentioned output e and this D-FF 32 will latch the "H" of the D input and will make the Q output j the "H". (See a, e and j, for example, at the time t in FIG. 14.) This D-FF 32 is to store that the sector mark is detected.

When the signal of the above mentioned output j is applied to the D input end of the D-FF 33 of the next step and the address mark detecting signal z is applied to the clock end, the j signal state will be latched. The loading signal 2 is applied to the resetting end and is reset together with the D-FF 32 at the timing of this loading signal g2. That is, in this D-FF 33, only in case the sector mark is detected (when the sector mark is determined to be adopted), the output k will become "H". (As shown, for example, by the time t2 in FIG. 14.)

When the output k of the above mentioned D-FF 33 is applied to the D input end of the D-FF 35 of the next step and the preselector mark adoption adequacy judging clock g1 generated prior to the loading signal g, is applied to the clock input end, the state of the output k will be latched and the output l will be output from the Q output end. (See, for example, the time t3 in FIG. 14.) As the D-FF 32 and 33 are reset by the loading signal g2 just after this (See, for example, the time t4 in FIG. 14), it is the role of this D-FF 35 to latch the adoption or non-adoption of the preselected mark.

When the output of the above mentioned D-FF 35 and the output of the first AND circuit 31 are passed through the second AND circuit 36, the sector mark interval measuring clock f1 will be produced (See the time t5 in FIG. 14) and will be applied to the clock input end of the D-FF 37 in the next step to latch the "H" of the D input.

That is, when the above mentioned D-FF 35 is set, if the sector mark is detected and the output of the first AND circuit 31 becomes "H", through the second AND circuit 36, the sector mark interval measuring clock f1 will be output, the state of the output of this clock f1 will be latched by the D-FF 37 in the next step and the output m will be output from the Q output end. It is needless to say that, at this timing. The D-FF 32 will be also set.

The output m of the above mentioned D-FF 37 is the address mark detecting signal z and is input into the third AND circuit 39 together with the Q output n of the D-FF 38 latching the "H" of the D input.

Figure 14:
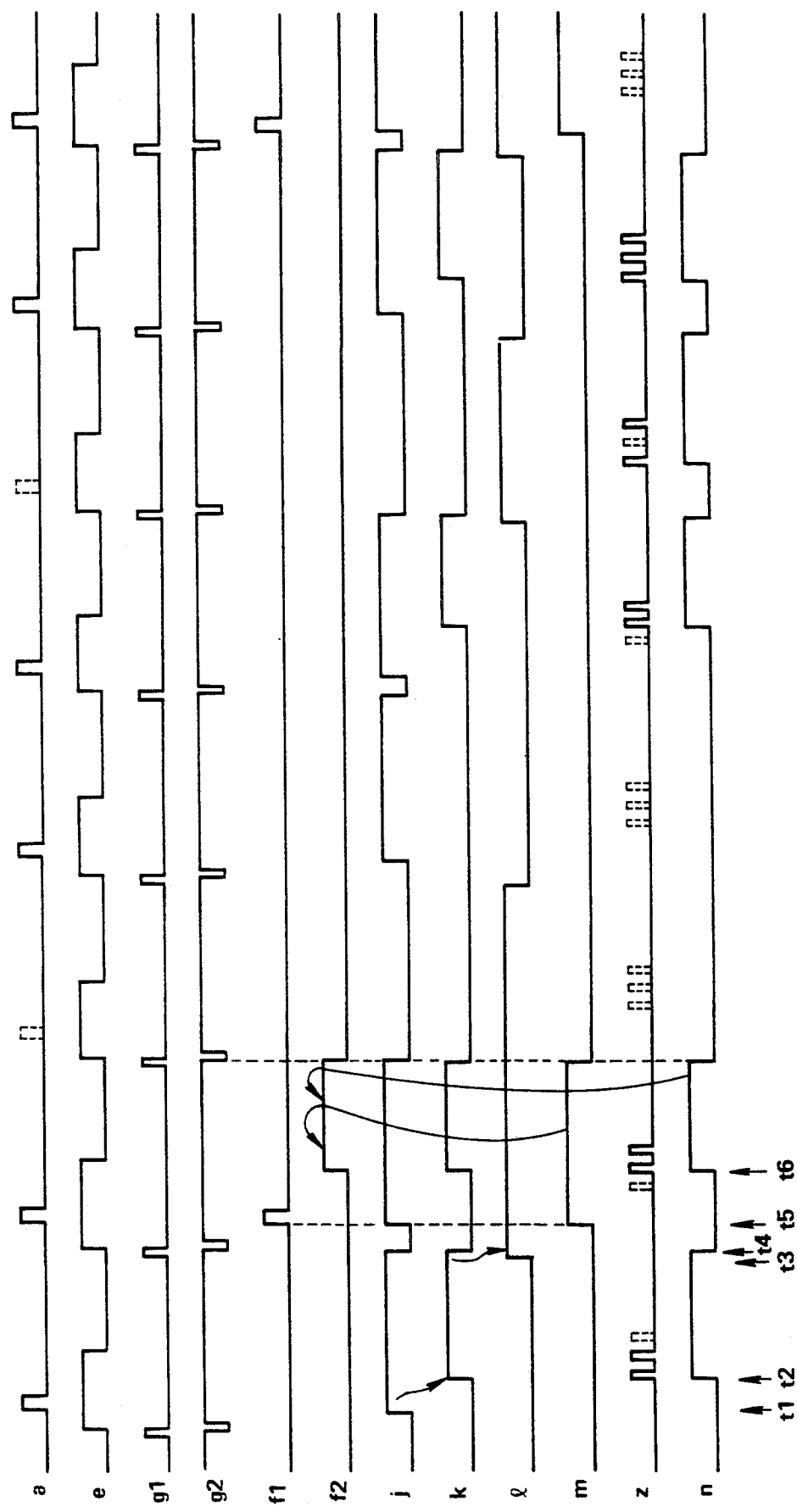

Therefore, when the D-FF 37 is set, if the address mark detecting signal z is output, the D-FF 38 is set and its Q output n is output, the sector mark interval latching signal f2 will be output through the AND circuit 39 (See the time t6 in FIG. 14). That is, the measured value is latched by this latching signal f2.

The D-FF 38 is also reset by the loading signal g2 together with the D-FF 32 and 33.

As the loading signal g2 is applied also to the resetting terminal of the above mentioned D-FF 37, even if the measuring clock f1 is output, unless the address mark is detected immediately after it, the Q output n of the D-FF 38 will become "L" and therefore the sector mark interval latching signal f2 will not be output (the case, for example, of the time t7 in FIG. 14).

In this embodiment, three address marks are provided and, when at least one of them is detected, the address mark detecting signal z will be output.

The first latch 12 is formed of the D-FF 12a, the "H" level voltage applied to the data input end D is latched with the output d of the second decoder 7 applied to the clock input end and the latching output e is applied to the data input end D of the D-FF 41. Also, this latching output e produces the preselector mark adoption adequacy judging clock g1 through the AND circuit 46 together with the Q output of the above mentioned D-FF 41. The Q output of this D-FF 41 is applied to the data input end D of the D-FF 42 in the next step and is passed through the NAND circuit 43 together with the Q output of the D-FF 42 to produce the loading signal g2.

The carrying pulse of the second counter 13 is applied to the data input end D of the D-FF 44 and is output to the OR circuit 45 from the output end Q by the 2F clocks. The resetting signal RST generated when the current source is on is also input into this OR circuit 45. The output of this OR circuit 45 is applied to the resetting terminals of the D-FF 12a, 41 and 42.

Figure 10:
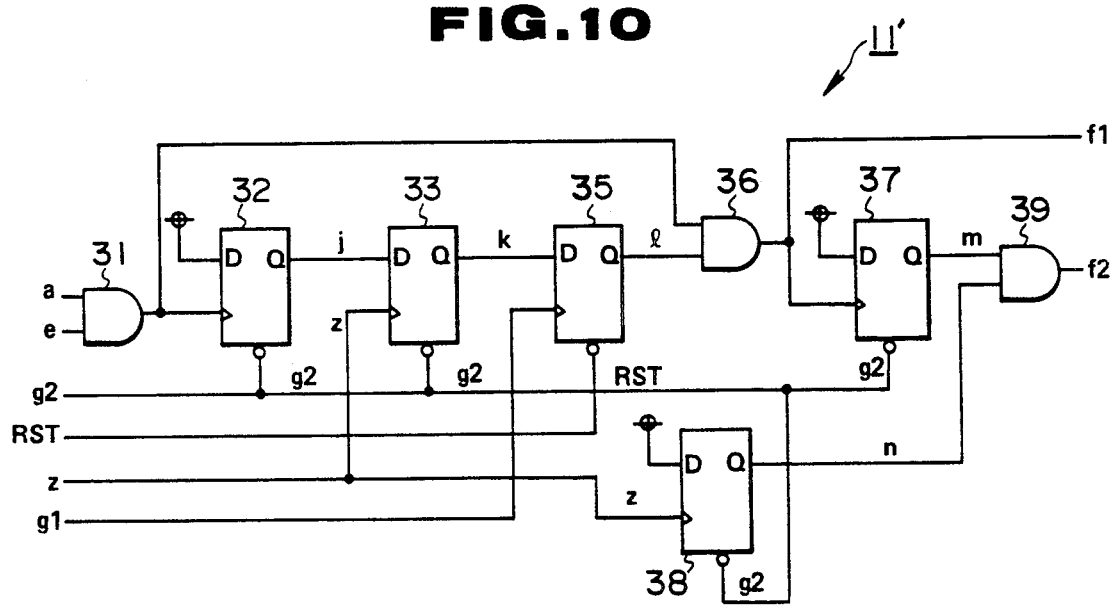
Figure 11:
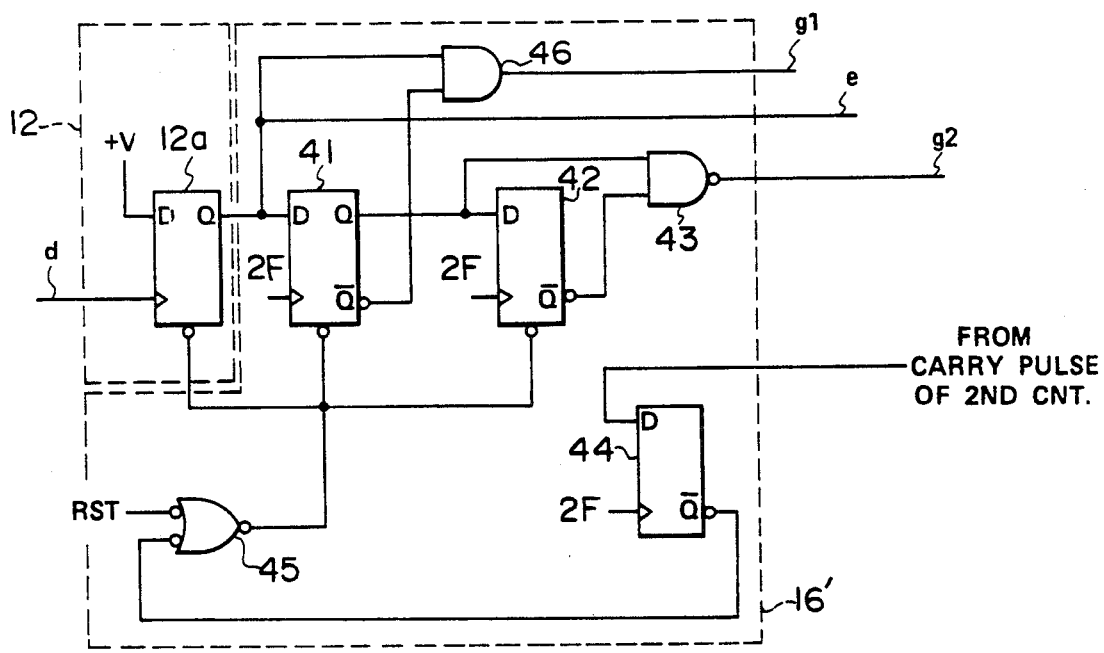

The formations of the above mentioned D-FF 41 and 42 and NAND circuit 43 are substantially the same as of the latching signal generating circuit 11' shown in FIG. 10.

Therefore, the latching output e of the first latch 12 is input and the loading signal g2 generated in each sector near the end of the data area is output.

When the above mentioned loading signal g2 is applied to the loading terminal of the third counter 14, the data depending on the sector mark interval latched by the sector mark interval anticipating circuit 10 will be loaded, counting will be started from near the end of the data area and the quasi-sector mark signal h will be output to the resetting pulse generating circuit 4 near the position of the next sector mark detecting signal a.

The formation of the sector mark interval anticipating circuit 10 is shown in FIG. 12.

When the sector mark interval measuring clock $f_1$ output from the latching signal generating circuit 11' is applied to the clock input end of the shift register 51 of the first step and the latching signal f2 output from this latching signal generating circuit 11' is applied to the clock input ends of the shift registers 51a, 51b, 51m after the second step, only effective sector mark interval data will be taken into the measured data latching shift registers 51a, 51b, . . . , 51m and are accumulated sequentially until the past n (the number n of 51a, . . . , 51m), The data accumulated by the above mentioned shift registers 51a, . . . , 51m are added by the adder 52 and the added data are further passed through the divider 53 to be divided by n (the fractions shall be abandoned or 0.4 shall be abandoned and 0.5 shall be taken to obtain a data value of 1/n, that is, an average value. If this shift register number n is selected to be a number of multiplication of 2, the circuit made 1/n will be able to be substituted by abandoning the lower bits.

The thus determined average value is input into the anticipated value register 54, is taken into the mis-anticipated value register 54 by the clock delaying the latching signal f2 with the delay 55 and is input as loading data to the third counter 14.

The other formations are the same as in the first embodiment and are represented by the same reference numerals.

According to this second embodiment, as the average value of many effective sector mark interval data is determined by the sector mark interval anticipating circuit and the timing or the like of the generation of the next quasi-sector mark is determined by this average value, the sector mark interval can be accurately anticipated. Therefore, even in case the sector mark is not detected, the quasi-sector mark signal will be able to be accurately generated.

Also, in the latching signal, generating circuit 11', if the detected sector mark, which is mis-detected or not, is determined by using the address mark z and the sector mark detecting signal a which is not determined to be mis-detected is adopted as a sector mark detecting signal. Therefore, a sector mark detecting apparatus high in the reliability can be realized. Thus, by using the composite sector mark signal c output from this apparatus for the WRIGHT/READ controlling signal or the like, the recording/reading or the like with dew errors can be made.

In the above mentioned embodiment, the composite sector mark signal c of the sector mark detecting signal a and quasi-sector mark signal h is produced by preferring the sector mark detecting signal a. However, as shown in the later described fourth embodiment, in case the possibility of the mis-detection is high, the quasi-sector mark may be adopted also internally.

FIG. 15 shows the formation of a sector mark interval anticipating circuit 60 in the second embodiment of the present invention. This circuit 60 can be used as the sector mark interval anticipating circuit 10 in FIG. 9.

The counted data representing the sector mark interval output from the second counter 13 are input into a measured data latching register 61 and are latched by the sector mark interval measuring clock fl output from the latching signal generating circuit 11'. These latched data are input into a subtracter 62 and the data value latched by an anticipated value register 63 having the latching signal f2 as a clock is subtracted. This subtracted data value is input into a divider 64 and is made a data value made 1/x. In the case of this 1/x, the fractions shall be abandoned or 0.4 shall be abandoned and 0.5 shall be taken. The output of this divider 64 is input into an adder 65, is added with the data value latched by the anticipated value register 63 and is given as the added data to the anticipated value register 63. Therefore, when the sector mark interval latching clock f2 is applied, the output data value of the adder 65 will be stored by this anticipated value register 63 as a new anticipated value.

In this sector mark interval anticipating circuit 60, when the dividing number x of the divider 64 (1/x in the case of a multiplier) is adjusted (set) to be of a proper value, a very stable operation will be possible.

If the above mentioned x is selected to be a multiplication of 2, the lower bits may be abandoned. The x may best be selected to be about a plus or minus fluctuation.

According to this third embodiment, the circuit scale can be made smaller than that of the selector mark interval anticipating circuit in the third embodiment with the same operation possible.

The fourth embodiment of the present invention shall be explained in the following.

FIG. 16 shows a quasi-sector mark adopting circuit 71 in the fourth embodiment of the present invention.

This quasi-sector mark adopting circuit 71 is a circuit for internally re-adopting the quasi-sector mark in case the sector mark detecting signal a is judge to be an erroneous sector mark and is inserted between the first counter 5 and second decoder 7 in the second embodiment shown in FIG. 9.

In FIG. 16, the output of the first counter 5 is input into a latch 74 through a 2-complementary number circuit 72 and selector 73 (formed of AND circuits 73a and 73b and an OR circuit 73c).

On the other hand, the sector mark detecting signal a and latch output e are input into an AND circuit 75, its output is input into the AND circuit 73b forming the selector circuit 73 and the output of this AND circuit 75 will open at the time of "H" and outputs the output of the 2-complementary number circuit 72 to the latch 74. Also, the output of this AND circuit 75 is input into an OR circuit 76 together with the quasi-sector mark signal h and the output of this OR circuit 76 is applied to the clock input end of the latch 74 through a delay circuit 77.

Therefore, in case the first counter 5 starts a counting operation with the sector mark signal h and a sector mark is then detected by the sector mark detecting signal a, the output of the AND circuit 75 will become "H" and the selector 73 will output to the latch 74 a value becoming a complementary number of 2 for the counted value. Also, the output of this AND circuit 75 is applied as a clock of the latch 74 through the OR circuit 76 and delay circuit 77. As a result, the value making a complementary number of 2 of the counted value corresponding to the interval from the quasi-sector mark until the sector mark is detected will be stored in the latch 74.

The output of the above mentioned first counter 5 is input into an adder 79 together with the output having passed the latch 74 through an AND circuit 78, is added and is then input into the second decoder 7.

The output d of the above mentioned second decoder 7 is applied to the resetting terminal of a D-FF 80 and, in case this output d is "L", this D-FF 80 will be reset. In this D-FF 80, the output k (which will become "H" in case the sector mark is detected and further the address mark is also detected) of the D-FF 33 (See FIG. 3) of the latching signal generating circuit 11 is applied as a clock and the "H" of the D input is latched by this clock. The inverted output $\overline{Q}$ of this D-FF 80 becomes a gate signal of the AND circuit 78 in which the output of the latch 74 is input.

Therefore, only in case the above mentioned output k is not output, the value stored in the above mentioned latch 74 will open the AND circuit 78, will be input into the adder 79 and will be added with the output of the first counter 5. On the other hand, even if the sector mark is detected, unless the address mark is detected, only the counted value of the first counter 5 will be input into the adder 79 and, in such a case, the input into the second decoder 7 will be the counted value itself of the first counter.

The AND circuits 73a and 73b of the selector 73 and AND circuit 78 are described as combined for the number of bits of the latch 74.

The operation of this quasi-selector mark adopting circuit 71 shall be explained in the following with reference to FIGS. 17A–17B.

As shown in FIGS. 17A and 17B, in case the first counter 5 is started by a quasi-sector mark and then a sector mark is detected, a value b made a complementary number of 2 of the counted value corresponding to the time interval from the generation of the quasi-sector mark to the detection of the sector mark will be stored in the latch 74 by applying the output of the AND circuit 75 to the clock input end through the OR circuit 76 and delay circuit 77. The first counter 5 will be restarted by the above mentioned sector mark.

On the other hand, the input into the second decoder 7 is an addition of the value stored by the latch 74 to the counted value of the first counter 5 and is the value of a-b shown in FIG. 17A wherein a represents an inherent changing position.

When the address mark advances as it is without being detected, the detected sector mark will be made an error and the quasi-sector mark will be re-adopted and, when the A-b becomes a value of the second decoder 7, an output d will be output.

On the other hand, when the above mentioned address mark is detected, the output k will be clocked and applied to the D-FF 80, the inverted output $\overline{Q}$ will become "L", therefore the output of the AND circuit 78 will become "$\phi$", the input into the second decoder 7 will become the counted value itself of the first counter 5 and the second decoder 7 will output the output d in the inherent changing position a adopting the address mark as shown in FIG. 17B.

As different from the above mentioned FIGS. 17A and 17B, in case the sector mark is first detected and then the quasi-sector mark is detected, a counted value corresponding to the interval from the detection of the sector mark to the generation of the quasi-sector mark will be stored in the latch 74. This value is shown in FIGS. 17C and 17D.

At this time, the input into the second decoder 7 will be a+c shown in FIG. 17C.

If the address mark is not detected, the quasi-sector mark will be adopted and, when a+c becomes the value of the second decoder 7, the output d will be output.

On the other hand, if the address mark is detected, the output of the AND circuit 75 will become $\phi$, the counted value of the first counter 5 started by the detection of the address mark will be input as it is into the second decoder 7 and, when it becomes the value of the second decoder 7, the output d will be output.

In the above mentioned second embodiment, if the detected sector mark, which is mis-detected or not, is determined and the treatment in the case of the mis-detection is not particularly made. However, in this third embodiment, by adopting a quasi-sector mark, a sector mark detecting operation (production of a composite sector mark signal) having few errors can be made. Therefore, the control of the recording/reading high in reliability can be made.

For example, even in case there are many defects in an optical disc and even when a normal signal is not obtained during seeking, a stabilized interpolation will be able to be always made and various gate signals and controlling signals will be able to be continued to be stably output.

In the above mentioned second to fourth embodiments, as a sector mark interval anticipating means is provided and a means of judging if the detected sector mark is mis-detected or not is provided, a proper treatment will be able to be made by the output of this judging means.

FIG. 19 shows a part in the fifth embodiment of the present invention.

In this embodiment, in order to take care of the case that the sector mark interval varies in response to the disc radius or track address, when the track address to be sought is designated, the decoded value, for example, of the second decoder 7 will be able to be changed (set) by the track address.

That is, the decoded value is made small for the track on the inner peripheral side but large for the track on the outer peripheral side so that there may be a function of detecting an accurate sector mark in either track (in the case of an apparatus for scanning at a fixed linear velocity).

It is apparent that, in this invention, many working modes can be made without departing from the scope and spirit of the invention. This invention is not restricted by any specific working modes described herein except being limited by the appended claims.

What is claimed is:

1. A sector mark detecting apparatus comprising:
   a sector mark reading means for reading a sector mark signal which represents a sector mark area provided in a beginning part of a plurality of sectors formed by dividing each track of an optical disc;
   an interval measuring means, connected to said sector mark reading means for measuring an interval of the sector mark signals;
   a quasi-sector mark generating means, connected to said sector mark reading means and said interval measuring means, for generating a quasi-sector mark signal when said sector mark signal is anticipated to be detected in each sector based on a measured output of said interval measuring means;

a composite sector mark signal producing means for outputting a composite sector mark signal having a mis-reading of said sector mark signal compensated by said quasi-sector mark signal; and a judging means for determining if the sector mark signal output from said sector mark reading means is mis-detected, said judging means has an address detecting means for detecting an address mark and determining if the sector mark signal is mis-detected by whether said address mark is detected.

2. A sector mark detecting apparatus according to claim 1 wherein said interval measuring means has an averaging means for averaging past measured interval values measured by said interval measuring means and for outputting said averaged past measured interval values as said interval.

3. A sector mark detecting apparatus according to claim 1 wherein said composite sector marks signal producing means produces a composite sector mark signal by using said sector mark signal when both said sector mark signal and the quasi-sector mark signal are generated.

4. A sector mark detecting apparatus according to any one of claims 1, wherein said interval measuring means has a first counter means started by said sector mark signal or quasi-sector mark signal, for measuring a clock of a fixed frequency until a preset counted value and for outputting a timing signal.

5. A sector mark detecting apparatus according to claim 4 wherein said interval measuring means further has a memorizing means for holding, as a sector mark generation anticipating value, a time interval from a previous timing signal until a next sector mark signal is detected.

6. A sector mark detecting apparatus according to claim 5 wherein said interval measuring means further has a counting means feeding as a preset value to said timing signal, said anticipating value held by said memorizing means.

7. A sector mark detecting apparatus according to any one of claims 1 wherein said composite sector mark signal generating means is a timing means started by said sector mark signal or said quasi-sector mark signal and counting clocks of a fixed frequency until a small counted value.

8. A sector mark detecting apparatus according to claim 5 wherein said memorizing means will renew said anticipating value only in case the sector mark signal is continuously detected a plurality of times.

9. A sector mark detecting apparatus according to 5, wherein said memorizing means is a latching circuit.

10. A sector mark detecting apparatus according to claim 7, wherein said memorizing means has an averaging means for averaging said time intervals previously measured a plurality of times.

11. A sector mark detecting apparatus according to claim 10 wherein said averaging means comprises a plurality of shift registers, adders adding respective time intervals contained in respective shift registers, a divider determining the average value by dividing outputs of said adders and a latch storing an output of said divider.

12. A sector mark detecting apparatus according to claim 11 wherein said memorizing means comprises a first register holding a newest time interval, a second register holding past time intervals, a subtracter subtracting an output value of said second register from an output value of said first register, a divider dividing an output of said subtracter by a number of measuring times and an adder adding an output of said divider and the output value of said second register.

13. A sector mark detecting apparatus according to claim 1 wherein, when said judging means determines the sector mark signal to be mis-detected, said interval measuring means will measure clocks of a fixed frequency until a preset counted value by the quasi-sector mark signal and will generate a timing signal to be a reference timing for measuring the interval of the sector marks.

14. A sector mark detecting apparatus according to claim 13 wherein said interval measuring means further has a memorizing means for holding, as a sector mark generation anticipating value, a time interval from a previous timing signal until a next sector signal is detected.

15. A sector mark detecting apparatus according to claim 14 wherein said interval measuring means further has a counting means for feeding, as a preset value at a time of generating said timing signal, said anticipating value held by said memorizing means.

16. A sector mark detecting apparatus according to claims 4, further comprising a changing means which can change said preset counted value in response to a track address.

17. A sector mark detecting apparatus according to claim 3 wherein, in case said sector mark signal is detected at a predetermined timing, said sector mark signal will be used to produce a composite sector mark as preferred to said quasi-sector mark signal.

* * * * *